US012732119B2

(12) United States Patent
Morisaki et al.

(10) Patent No.: US 12,732,119 B2
(45) Date of Patent: Sep. 8, 2026

(54) POWER CONVERSION SYSTEM

(71) Applicant: TMEIC Corporation, Tokyo (JP)

(72) Inventors: Kouki Morisaki, Tokyo (JP); Issei Fukasawa, Tokyo (JP); Masahiro Kinoshita, Tokyo (JP)

(73) Assignee: TMEIC Corporation, Tokyo (JP)

( * ) Notice: Subject to any disclaimer, the term of this patent is extended or adjusted under 35 U.S.C. 154(b) by 166 days.

(21) Appl. No.: 18/689,945

(22) PCT Filed: Sep. 1, 2022

(86) PCT No.: PCT/JP2022/032946
§ 371 (c)(1),
(2) Date: Mar. 7, 2024

(87) PCT Pub. No.: WO2024/047841
PCT Pub. Date: Mar. 7, 2024

(65) Prior Publication Data

US 2024/0429834 A1 Dec. 26, 2024

(51) Int. Cl.
*H02M 7/537* (2006.01)
*H02M 1/00* (2006.01)
(Continued)

(52) U.S. Cl.
CPC ......... *H02M 7/537* (2013.01); *H02M 1/0048* (2021.05); *H02M 1/32* (2013.01); *H02M 1/322* (2021.05); *H02M 7/48* (2013.01)

(58) Field of Classification Search
CPC ...... H02M 7/537; H02M 1/0048; H02M 1/32; H02M 1/322
See application file for complete search history.

(56) References Cited

U.S. PATENT DOCUMENTS 5,777,862 A * 7/1998 Williams ................ H02M 1/32 363/56.1
7,957,165 B2 * 6/2011 Hasegawa ............... H02M 1/32 323/901

(Continued)

FOREIGN PATENT DOCUMENTS

WO WO 2020/110225 A1 6/2020

OTHER PUBLICATIONS

International Search Report & Written Opinion issued Nov. 15, 2022 in PCT/JP2022/032946, filed on Sep. 1, 2022, 10 pages (with English Translation).

*Primary Examiner* — Yusef A Ahmed
(74) *Attorney, Agent, or Firm* — XSENSUS LLP

(57) ABSTRACT

According to the present disclosure, there is provided an inexpensive power conversion system that can achieve loss reduction and space saving. The power conversion system includes: a power converter configured to convert direct-current power input from a direct-current power supply, into alternating-current power or direct-current power; a capacitor provided between a positive electrode direct-current line and a negative electrode direct-current line connected to input terminals of the power converter; a ground line provided with a first ground resistor and configured to connect the negative electrode direct-current line and a ground potential; a discharge line configured to connect the positive electrode direct-current line and the ground line on the ground potential side of the first ground resistor; and a discharge switch provided in the discharge line and configured to be turned on to discharge residual charges of the capacitor.

3 Claims, 2 Drawing Sheets

(51) Int. Cl.
*H02M 1/32* (2007.01)
*H02M 7/48* (2007.01)

(56) References Cited

U.S. PATENT DOCUMENTS 8,022,658 B2 * 9/2011 Ide .................... G01R 31/1227 363/40
9,912,146 B1 * 3/2018 Wang .................... H02H 7/122
10,416,224 B2 * 9/2019 Tamida .................. G01R 31/34
10,425,031 B2 * 9/2019 Satou .................... G01R 27/08
10,439,400 B2 * 10/2019 Barker ................ H02H 7/1252
10,641,817 B2 * 5/2020 Chou .................. G01R 27/025
11,079,444 B2 * 8/2021 Tamida .................. G01R 31/12
11,579,198 B2 * 2/2023 Yura ...................... H02P 27/06
2005/0259370 A1 * 11/2005 Kubo .................... G01R 31/52 361/42
2009/0195205 A1 * 8/2009 Ide .................... G01R 31/1227 318/490
2010/0164278 A1 * 7/2010 Oyobe ................... H02M 1/36 307/9.1
2011/0006781 A1 * 1/2011 Kawamura ............ G01R 31/52 324/551
2011/0068714 A1 * 3/2011 Komatsu ............... H02M 3/156 315/307
2011/0084705 A1 * 4/2011 Kawamura .......... G01R 27/025 324/551
2011/0280053 A1 * 11/2011 Halberstadt ........... H02M 3/155 363/126
2013/0147491 A1 * 6/2013 Kawamura ............ G01R 27/18 324/509
2013/0200956 A1 * 8/2013 Hsiao .................... H03K 4/502 331/111
2014/0333321 A1 * 11/2014 Kawamura ............ G01R 27/18 324/509
2014/0347770 A1 * 11/2014 Falk ........................ H02H 7/20 361/42
2015/0155787 A1 * 6/2015 Chen ................ H02M 3/33523 363/21.15
2016/0089998 A1 * 3/2016 Thommes ............. B60L 3/0069 701/22
2016/0377670 A1 * 12/2016 Tamida ................. G01R 31/52 324/551
2018/0091083 A1 * 3/2018 Satou .................. G01R 31/346
2019/0128943 A1 * 5/2019 Kawamura ........... H01M 10/48
2019/0195931 A1 * 6/2019 Kawamura ........... B60L 3/0069
2020/0044581 A1 * 2/2020 Tanaka .............. H02M 7/53871
2020/0136371 A1 * 4/2020 Tawada .................. H02M 1/32
2020/0153247 A1 * 5/2020 Umeda .................. H02J 3/466
2020/0191881 A1 * 6/2020 Kawamura ............. H02J 7/345
2020/0235664 A1 * 7/2020 Takei .................... H02M 7/537
2020/0319261 A1 * 10/2020 Kawamura ............ G01R 31/52
2021/0063494 A1 * 3/2021 Katsukura ................ H02H 3/16
2021/0399627 A1 * 12/2021 Fukasawa ........... H02M 7/4835
2022/0045624 A1 * 2/2022 Takahashi ............... H02M 1/32
2022/0128632 A1 * 4/2022 Lai ......................... H02M 1/36
2022/0320889 A1 * 10/2022 Ono ...................... H02M 1/322
2022/0385171 A1 * 12/2022 Fukasawa ............. H02M 1/327
2022/0416648 A1 * 12/2022 Fukasawa ........... H02M 1/0012
2023/0036795 A1 * 2/2023 Kominato ............... B60R 16/03
2023/0307945 A1 * 9/2023 Shen .................. H02J 7/00304
2023/0345602 A1 * 10/2023 Hariharan ........... H02M 1/0058
2023/0375641 A1 * 11/2023 Lai ........................ G01R 31/52

* cited by examiner

POWER CONVERSION SYSTEM

FIELD

The present disclosure relates to a power conversion system, and in particular to a power conversion system including a capacitor on a direct-current power supply side of a power converter.

BACKGROUND

PTL 1 described below discloses a power conversion system. In the power conversion system, a capacitor and a discharge circuit discharging charges stored in the capacitor are provided in parallel to each other between a positive electrode direct-current line (also referred to as positive electrode busbar) and a negative electrode direct-current line (also referred to as negative electrode busbar) connected to input terminals of a power converter.

CITATION LIST

Patent Literature

[PTL 1] WO 2020/110225

SUMMARY

Technical Problem

In the power conversion system disclosed in PTL 1 described above, the discharge circuit includes only a discharge resistor, and does not include a discharge resistor and a switch connected in series with each other. During a period when direct-current power is supplied from a direct-current power supply to the power converter, a relatively high direct-current voltage is constantly applied to the discharge resistor. Accordingly, it is necessary to increase a capacity as a whole of the discharge resistor. As a result, a loss of the power conversion system is increased as a loss of the discharge resistor is increased. In addition, when a capacity per one discharge resistor is increased, a cost of the discharge resistor is increased. In a case where a plurality of discharge resistors each having a relatively small capacity are connected in series, the number of discharge resistors is increased. In addition to increase in cost of the whole of the discharge resistors, an installation space is increased.

The present disclosure is made to solve the above-described issues, and an object of the present disclosure is to provide an inexpensive power conversion system that can achieve loss reduction and space saving.

Solution to Problem

A power conversion system of a first aspect of the present disclosure, comprises: a power converter configured to convert direct-current power input from a direct-current power supply, into alternating-current power or direct-current power; a capacitor provided between a positive electrode direct-current line and a negative electrode direct-current line connected to input terminals of the power converter; a ground line provided with a first ground resistor and configured to connect the negative electrode direct-current line and a ground potential; a discharge line configured to connect the positive electrode direct-current line and the ground line on the ground potential side of the first ground resistor; and a discharge switch provided in the discharge line and configured to be turned on to discharge residual charges of the capacitor.

A second aspect further includes the following characteristics in addition to the first aspect. A second ground resistor is provided in the ground line on the ground potential side from a connection point with the discharge line.

OLA third aspect further includes the following characteristics in addition to the first or second aspect. A first disconnection switch is provided in each of the positive electrode direct-current line and the negative electrode direct-current line, and the first disconnection switches are configured to be turned off to disconnect the direct-current power supply from the power converter. A second disconnection switch is provided in an output line from the power converter to a power system, and the second disconnection switch is configured to be turned off to disconnect the power system from the power converter. A control apparatus is configured to control ON or OFF of each of the discharge switch, the first disconnection switches, and the second disconnection switch. The control apparatus is configured to turn on the discharge switch after turning off the first disconnection switches and the second disconnection switch.

Advantageous Effects of Invention

According to the first aspect of the present disclosure, when the discharge switch is turned on, the charges stored in the capacitor are discharged by the first ground resistor provided in the ground line. In other words, the first ground resistor can also be used as the discharge resistor. This makes it possible to eliminate the discharge resistor provided between the positive electrode direct-current line and the negative electrode direct-current line in the existing technique. Further, during a period when the direct-current power is supplied from the direct-current power supply to the power converter, the discharge switch is turned off, and the relatively high direct-current voltage is not constantly applied to the first ground resistor. Therefore, it is unnecessary to increase a capacity of the first ground resistor. This makes it possible to achieve cost reduction and power saving of the power conversion system. In addition, it is possible to reduce the loss of the power conversion system by an amount of the discharge resistor in the existing technique.

According to the second aspect, even if a ground fault occurs in the negative electrode direct-current line, a short-circuit accident does not occur because the second ground resistor is provided. This makes it possible to improve safety in discharging.

According to the third aspect, the opening/closing operation of the various kinds of switches of the control apparatus makes it possible to surely discharge the residual charges of the capacitor.

DESCRIPTION OF EMBODIMENTS

Figure 1:
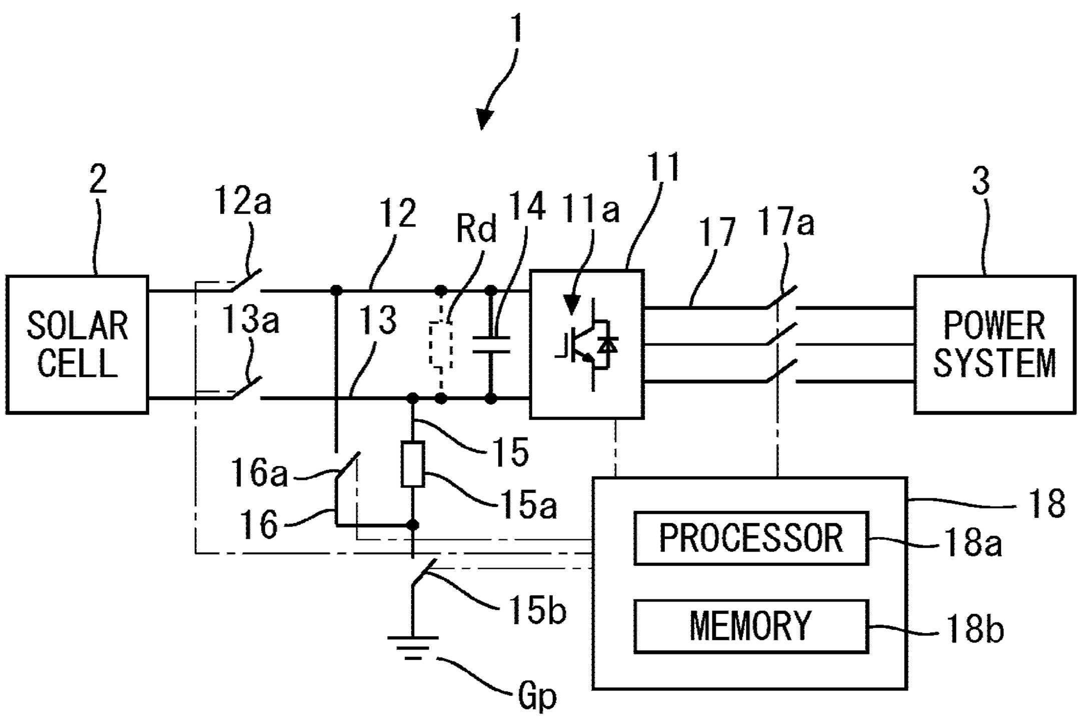
FIG. 1 is a diagram to explain a configuration example of a power conversion system according to Embodiment 1.

Some embodiments of the present invention are described in detail below with reference to drawings. Common or corresponding elements in the drawings are denoted by the same reference numerals, and description of the elements is simplified or omitted.

Embodiment 1

FIG. 1 is a diagram to explain a configuration example of a power conversion system 1 according to Embodiment 1. Note that a discharge resistor Rd illustrated by a dashed line in FIG. 1 is provided in an existing power conversion system, but is not provided in the power conversion system 1 according to the present embodiment.

The power conversion system 1 includes a power converter 11. The power converter 11 is a DC/AC converter that converts direct-current power supplied from a direct-current power supply 2, into alternating-current power, and supplies the converted alternating-current power to a power system 3. The power converter 11 includes a plurality of switching elements 11*a*, and unillustrated gate circuits that supply gate driving signals to the respective switching elements 11*a*. Each of the switching elements 11*a* is, for example, an IGBT or an MOSFET. As the power converter 11, a well-known power converter can be used. Therefore, further description is omitted.

The direct-current power supply 2 may be, for example, a solar cell or a rechargeable battery. The direct-current power supply 2 may be a direct-current power supply system including an aerogenerator and an alternating-current/direct-current converter.

A positive electrode direct-current line 12 and a negative electrode direct-current line 13 are connected to input terminals of the power converter 11. The positive electrode direct-current line 12 is connected to a positive electrode of the direct-current power supply 2 through a switch 12*a*, and the negative electrode direct-current line 13 is connected to a negative electrode of the direct-current power supply 2 through a switch 13*a*. The switches 12*a* and 13*a* each correspond to a first disconnection switch that is turned off to disconnect the direct-current power supply 2 from the power converter 11. The switches 12*a* and 13*a* can be respectively interposed in the positive electrode direct-current line 12 and the negative electrode direct-current line 13.

A capacitor 14 is provided between the positive electrode direct-current line 12 and the negative electrode direct-current line 13. One end of a ground line 15 is connected to the negative electrode direct-current line 13. Another end of the ground line 15 is connected to a ground potential Gp. In the ground line 15, a first ground resistor 15*a* and a ground switch 15*b* are provided in series, from a connection point with the negative electrode direct-current line 13. In other words, the negative electrode direct-current line 13 is grounded through the first ground resistor 15*a* and the ground switch 15*b* that are connected in series. A capacity of the first ground resistor 15*a* is less than a capacity (for example, 400 W×5 pieces=2000 W) of the existing discharge resistor Rd, and can be set to, for example, 400 W. The first ground resistor 15*a* can include a plurality of resistors. The ground switch 15*b* is normally turned on. Note that the ground switch 15*b* is not essential, and the negative electrode direct-current line 13 may be grounded through the ground resistor 15*a*.

The power conversion system 1 according to the present embodiment includes a discharge line 16 in which a discharge switch 16*a* is interposed. One end of the discharge line 16 is connected to the positive electrode direct-current line 12. Another end of the discharge line 16 is connected between the first ground resistor 15*a* and the ground switch 15*b* of the ground line 15. The discharge switch 16*a* is turned on to discharge the charges stored in the capacitor 14, and is normally turned off.

The power system 3 is connected to output terminals of the power converter 11 through output lines 17 of three phases. Each of the output lines 17 is provided with a switch 17*a*. The switches 17*a* each correspond to a second disconnection switch that is turned off to disconnect the power system 3 from the power converter 11. Note that the output lines 17 may be of a single phase or two phases.

The power conversion system 1 includes a control apparatus 18. The control apparatus 18 is configured to totally control the power conversion system 1 by controlling ON/OFF operation (opening/closing operation) of the gate circuits of the power converter 11 and various kinds of switches 12*a*, 13*a*, 15*b*, 16*a*, and 17*a*.

Functions of the control apparatus 18 can be realized by a processing circuit. For example, the processing circuit includes at least one processor 18*a* and at least one memory 18*b*, or includes at least one piece of dedicated hardware (not illustrated). In a case where the processing circuit includes the at least one processor 18*a* and the at least one memory 18*b*, the functions of the control apparatus 18 are realized by software, firmware, or a combination of software and firmware. At least one of the software and the firmware is described as a program. At least one of the software and the firmware is stored in the at least one memory 18*b*. The at least one processor 18*a* realizes the functions of the control apparatus 18 by reading out and executing programs stored in the at least one memory 18*b*. The at least one processor 18*a* is also referred to as a central processing unit, a processing device, a calculation device, a microprocessor, a microcomputer, or a DSP. For example, the at least one memory 18*b* is a nonvolatile or volatile semiconductor memory such as a RAM, a ROM, a flash memory, an EPROM, and an EEPROM, a magnetic disk, a flexible disk, an optical disk, a compact disk, a minidisk, or a DVD.

Next, operation of the above-described power conversion system 1 is described. The switches 12*a*, 13*a*, and 17*a* are turned on to supply the direct-current power from the direct-current power supply 2 to the power converter 11. The power converter 11 drives the switching elements 11*a* based on an instruction input from the control apparatus 18, to convert the direct-current power into the alternating-current power, and supplies the converted alternating-current power to the power system 3. During a period when the power is supplied to the power system 3 in the above-described manner, the discharge switch 16*a* is turned off and the ground switch 15*b* is turned on.

There is a case where the operation of the power converter 11 is stopped, or a case where supply of the direct-current power from the direct-current power supply 2 to the power converter 11 is stopped. In this case, the control apparatus 18 turns off the switches 12*a*, 13*a*, and 17*a* to disconnect the direct-current power supply 2 and the power system 3 from the power converter 11.

Thereafter, the control apparatus 18 turns on the discharge switch 16*a*, and turns off the ground switch 15*b*. As a result, the charges stored in the capacitor 14 are discharged by the first ground resistor 15*a* provided in the ground line 15. In other words, the first ground resistor 15*a* is also used as the discharge resistor, which makes it possible to surely discharge residual charges in the capacitor 14. This makes it possible to eliminate the discharge resistor Rd provided between the positive electrode direct-current line 12 and the negative electrode direct-current line 13 in the existing technique. In addition, unlike the discharge resistor Rd in the existing technique, the relatively high direct-current voltage is not constantly applied to the first ground resistor 15*a*. Therefore, the capacity of the first ground resistor 15*a* may be less than the capacity of the discharge resistor Rd. In other words, it is unnecessary to increase the capacity of the first ground resistor 15*a*. As a result, it is possible to achieve cost reduction and space saving of the power conversion system 1. Furthermore, the loss of the power conversion system 1 can be reduced by an amount of the discharge resistor Rd.

Embodiment 2

Figure 2:
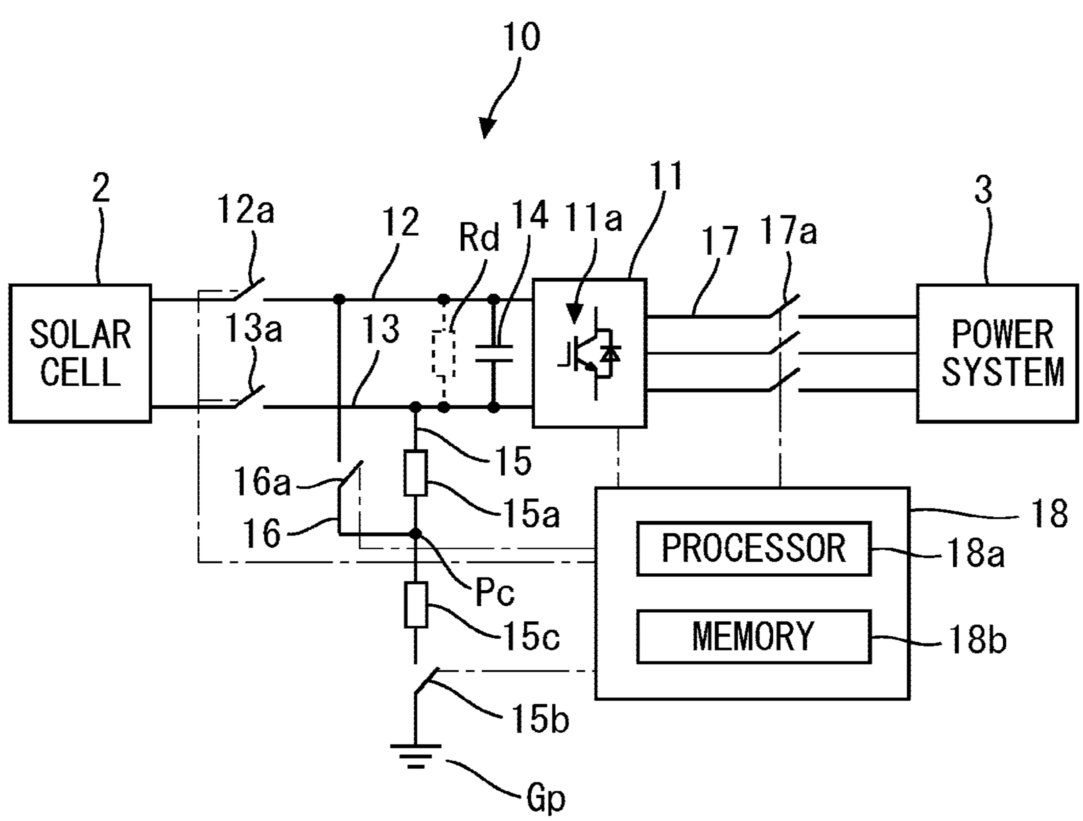
FIG. 2 is a diagram to explain a configuration example of a power conversion system according to Embodiment 2.

FIG. 2 is a diagram to explain a configuration example of a power conversion system 10 according to Embodiment 2. The power conversion system 10 is different from the power conversion system 1 according to Embodiment 1 in that a second ground resistor 15*c* is further provided in the ground line 15. In the following, the difference is mainly described.

The second ground resistor 15*c* is provided between the first ground resistor 15*a* and the ground switch 15*b*. Further, the discharge line 16 is connected to a point between the first ground resistor 15*a* and the second ground resistor 15*c*. In other words, the second ground resistor 15*c* is provided in the ground line 15 on the ground potential Gp side from a connection point Pc with the discharge line 16. A capacity of the second ground resistor 15*c* can be set to be less than or equal to the capacity of the first ground resistor 15*a*, and can be set to, for example, 200 W. The second ground resistor 15*c* can include a plurality of resistors. Further, the ground resistor includes two ground resistors 15*a* and 15*c*. Therefore, the capacity of the first ground resistor 15*a* may be set to a capacity less than the capacity in Embodiment 1, for example, 300 W.

According to the present embodiment, the ground switch 15*b* is turned off to discharge the residual charges of the capacitor 14. This enables discharging in a state where the negative electrode direct-current line 13 is grounded through the second ground resistor 15*c*. Accordingly, even if a ground fault occurs in the negative electrode direct-current line 13, a short-circuit accident does not occur. Therefore, safety in discharging can be improved.

Although the embodiments of the present invention are described above, the present invention is not limited to the above-described embodiments, and can be variously modified and implemented without departing from the gist of the present invention. In the above-described embodiment, the power conversion system converting the direct-current power into the alternating-current power is described as an example; however, the present invention can be applied to a power conversion system converting the direct-current power into the direct-current power. Further, when numerals of the number, the quantity, the amount, the range, and the like of the elements are mentioned in the above-described embodiments, the present invention is not limited to the mentioned numerals except for the case of being particularly clearly mentioned and the case of being obviously specified to the numerals in principle. Further, the structure and the like described in the above-described embodiments are not necessarily essential for the present invention except for the case of being particularly clearly mentioned and the case of being obviously specified to the structure and the like in principle.

REFERENCE SIGNS LIST

1 . . . Power conversion system, 2 . . . Direct-current power supply, 3 . . . Power system, 11 . . . Power converter, 12 . . . Positive electrode direct-current line, 12*a* . . . First disconnection switch, 13 . . . Negative electrode direct-current line, 13*a* . . . First disconnection switch, 14 . . . Capacitor, 15 . . . Ground line, 15*a* . . . First ground resistor, 15*c* . . . Second ground resistor, 16 . . . Discharge line, 16*a* . . . Discharge switch, 17 . . . Output line, 17*a* . . . Second disconnection switch, 18 . . . Control apparatus, Gp . . . Ground potential, Pc . . . Connection point

The invention claimed is:

1. A power conversion system, comprising:

a power converter configured to convert direct-current power input from a direct-current power supply, into alternating-current power or direct-current power;

a capacitor provided between a positive electrode direct-current line and a negative electrode direct-current line connected to input terminals of the power converter;

a ground line provided with a first ground resistor and configured to connect the negative electrode direct-current line and a ground potential;

a ground switch provided in the ground line on grounding potential side of the first ground resistor;

a discharge line configured to connect the positive electrode direct-current line and the ground line on the ground potential side of the first ground resistor;

a discharge switch provided in the discharge line and configured to be turned on to discharge residual charges of the capacitor;

a first disconnection switch provided in each of the positive electrode direct-current line and the negative electrode direct-current line, and configured to be turned off to disconnect the direct-current power supply from the power converter;

a second disconnection switch provided in an output line from the power converter to a power system, and configured to be turned off to disconnect the power system from the power converter; and a control apparatus configured to control ON or OFF of each of the discharge switch, the first disconnection switches, and the second disconnection switch, the control apparatus being configured to turn on the discharge switch after turning off the first disconnection switches and the second disconnection switch.

2. The power conversion system according to claim 1, wherein a second ground resistor is provided in the ground line on the ground potential side from a connection point with the discharge line.

3. The power conversion system according to claim 1, wherein the discharge line is configured to connect the positive electrode direct-current line and the ground line between the first ground resistor and the ground switch, and the ground switch is configured to be turned off when the discharge switch is turned on.

* * * * *